United States Patent
Kaddouh

(10) Patent No.: US 12,145,537 B2
(45) Date of Patent: Nov. 19, 2024

(54) VEHICLE LADDER

(71) Applicant: NISSAN NORTH AMERICA, INC., Franklin, TN (US)

(72) Inventor: Sam Kaddouh, West Bloomfield, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 1056 days.

(21) Appl. No.: 17/085,970

(22) Filed: Oct. 30, 2020

(65) Prior Publication Data
US 2022/0134954 A1 May 5, 2022

(51) Int. Cl.
*B60R 3/00* (2006.01)
*E06C 5/02* (2006.01)

(52) U.S. Cl.
CPC . *B60R 3/00* (2013.01); *E06C 5/02* (2013.01)

(58) Field of Classification Search
CPC ........... B60R 3/00; B60R 3/005; B60R 3/007; B60R 3/02; B60R 9/0423; E06C 5/02; E06C 5/24; E06B 7/28; B60J 5/107
See application file for complete search history.

(56) References Cited

U.S. PATENT DOCUMENTS

| | | | | |
|---|---|---|---|---|
| 4,249,683 A * | 2/1981 | Park | | B62D 43/02 414/466 |
| 4,406,384 A * | 9/1983 | Schantz | | B60R 9/06 224/508 |
| 5,039,119 A * | 8/1991 | Baughman | | B60R 3/005 182/127 |
| 6,966,403 B1 * | 11/2005 | Chandra | | E06C 7/003 182/129 |
| D549,838 S * | 8/2007 | Badillo | | D25/64 |
| 8,047,331 B2 * | 11/2011 | Spicer | | E06C 7/42 182/127 |
| 8,985,933 B2 * | 3/2015 | Ziaylek | | E06C 5/24 414/469 |
| 9,463,748 B2 | 10/2016 | Presley | | |
| 9,702,114 B2 * | 7/2017 | Larson | | E02F 9/18 |
| 10,030,446 B2 * | 7/2018 | Badillo | | B62D 65/16 |
| 10,738,532 B2 * | 8/2020 | Badillo | | B60R 3/005 |
| D906,546 S * | 12/2020 | Badillo | | D25/64 |
| 11,427,265 B2 * | 8/2022 | Williamson | | B62D 33/0273 |
| 2007/0090139 A1 | 4/2007 | McKenzie | | |
| 2012/0318178 A1 | 12/2012 | Hanks et al. | | |
| 2015/0027812 A1 * | 1/2015 | Budziak | | E06C 7/484 182/107 |
| 2017/0050571 A1 * | 2/2017 | Badillo | | B60R 3/005 |
| 2018/0201195 A1 * | 7/2018 | Downing | | E06C 5/04 |
| 2018/0290596 A1 | 10/2018 | Fukushima et al. | | |
| 2022/0073004 A1 * | 3/2022 | Salter | | B60B 39/12 |
| 2022/0134955 A1 * | 5/2022 | Kaddouh | | E06C 5/02 182/127 |

(Continued)

*Primary Examiner* — Daniel P Cahn
*Assistant Examiner* — Steven D Yates
(74) *Attorney, Agent, or Firm* — Global IP Counselors, LLP

(57) ABSTRACT

A vehicle includes a vehicle body, a tailgate, a ladder and a counterweight. The tailgate is movably attached to the vehicle body. The ladder is attached to the tailgate at a first lateral side of the tailgate. The counterweight provided to the tailgate at a second lateral side of the tailgate. The second lateral side is opposite of the first lateral side to provide a counterbalance to a weight of the ladder.

19 Claims, 6 Drawing Sheets

(56) References Cited

U.S. PATENT DOCUMENTS

| | | | | |
|---|---|---|---|---|
| 2022/0136328 A1* | 5/2022 | Lajoie | ...................... | E06C 7/188 |
| | | | | 182/206 |
| 2024/0001855 A1* | 1/2024 | Gandolfo | ................ | B60R 5/044 |
| 2024/0010133 A1* | 1/2024 | Badillo | .................. | B60R 9/045 |

* cited by examiner

VEHICLE LADDER

BACKGROUND

Field of the Invention

The present invention generally relates to a vehicle ladder. More specifically, the present invention relates to a vehicle ladder configured to be mounted to a vehicle tailgate.

Background Information

Vehicles, particularly large vehicles or work vehicles, can be equipped with a ladder or a service ladder that provides the vehicle's operator access with from the ground to upper portions (e.g., the roof) of the vehicle. The ladder enables the vehicle's operator to climb up the ladder's body and onto the roof area or a service platform to perform various service/maintenance operations, such as servicing, cleaning or accessing storage equipment.

SUMMARY

In view of the state of the known technology, one aspect of the present disclosure is to provide a vehicle comprises a vehicle body, a tailgate, a ladder and a counterweight. The tailgate is movably attached to the vehicle body. The ladder is attached to the tailgate at a first lateral side of the tailgate. The counterweight provided to the tailgate at a second lateral side of the tailgate. The second lateral side is opposite of the first lateral side to provide a counterbalance to a weight of the ladder.

In view of the state of the known technology, another aspect of the present disclosure is to provide a ladder configured to be mounted to a vehicle. The ladder comprises a pair of siderails, a plurality of rungs, a pair of top hanger plates and a pair of bottom hanger plates. The pair of siderails has a first end and a second end. The first end defines a top end of the ladder. The second end defines a bottom end of the ladder. The plurality of rungs are connected to the pair of siderails. The pair of top hanger plates are fixed to the first end of the pair siderails. The top hanger plates have a pair of first hooks for attaching the ladder to a tailgate of the vehicle. The pair of bottom hanger plates are fixed to the second end of the siderails. The bottom hanger plates have a pair of second hooks for attaching the ladder to the tailgate of the vehicle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
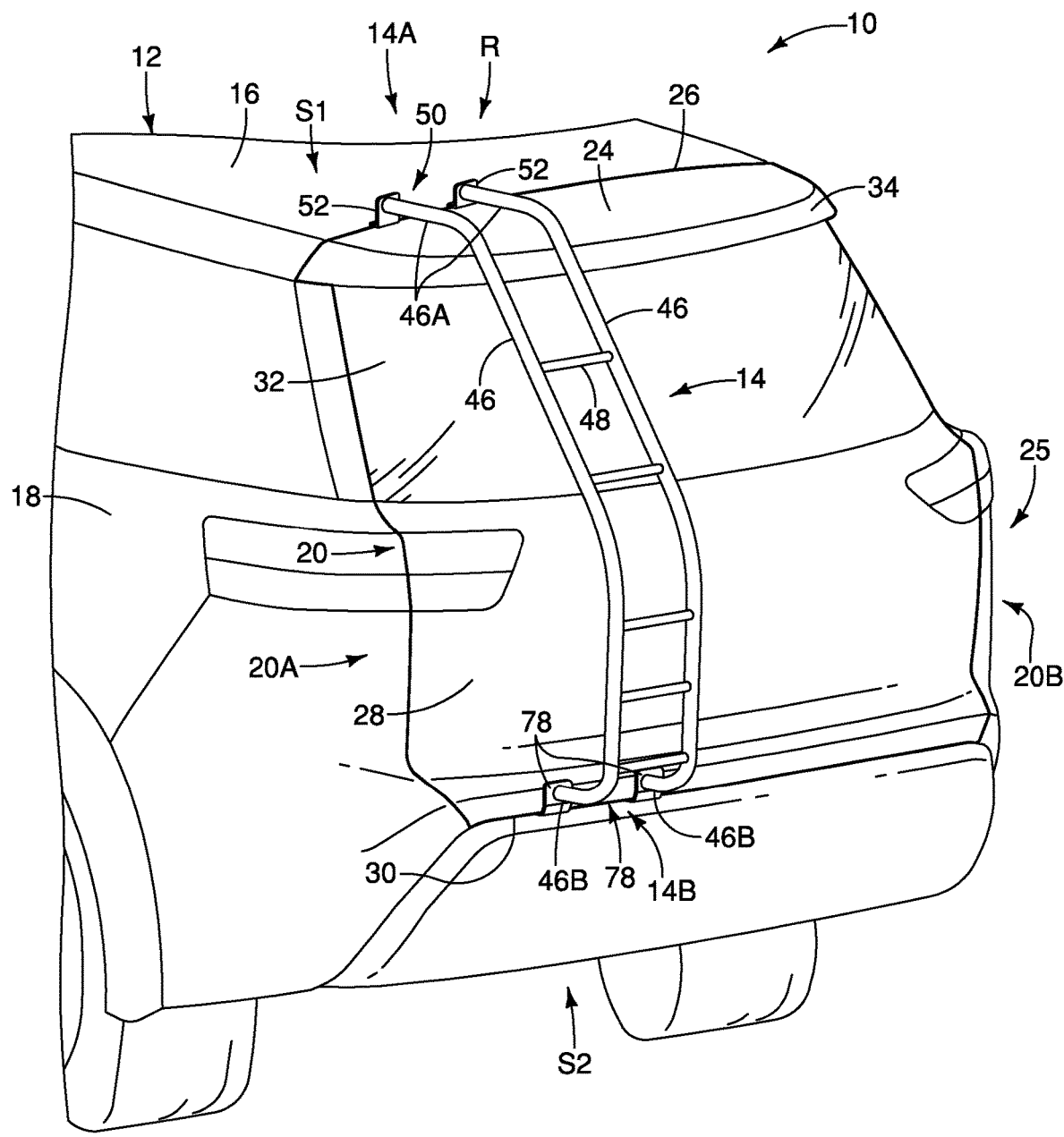
FIG. 1 is a perspective view of a vehicle rear showing a ladder mounted to the vehicle's tailgate.

Referring initially to FIG. 1, a portion of a vehicle 10 is illustrated in accordance with an embodiment. The vehicle 10 comprises a vehicle body 12 and a ladder 14 that is provided to the vehicle body 12. As shown, the vehicle 10 is equipped with the vehicle ladder 14. Therefore, the vehicle 10 of the illustrated embodiment includes the ladder 14 that is provided to the vehicle body 12. While the vehicle 10 is illustrated as being a sports utility vehicle, it will be apparent to those skilled in the vehicle field from this disclosure that the vehicle 10 can alternatively be another type of vehicle, as a service vehicle that is equipped with the ladder 14 in accordance with the illustrated embodiment.

The vehicle body 12 has a vehicle roof R that is defined by a roof panel body structure 16 that defines a roof surface S1 of the vehicle 10. In the illustrated embodiment, the roof panel body structure 16 can be a roof panel or any other body structure that at least partially defines the vehicle's roof R or the roof surface S1. The ladder 14 is constructed and positioned with respect to the vehicle body 12 to enable the vehicle's 10 operator to access the vehicle's roof R, as will be further described below.

Figure 2:
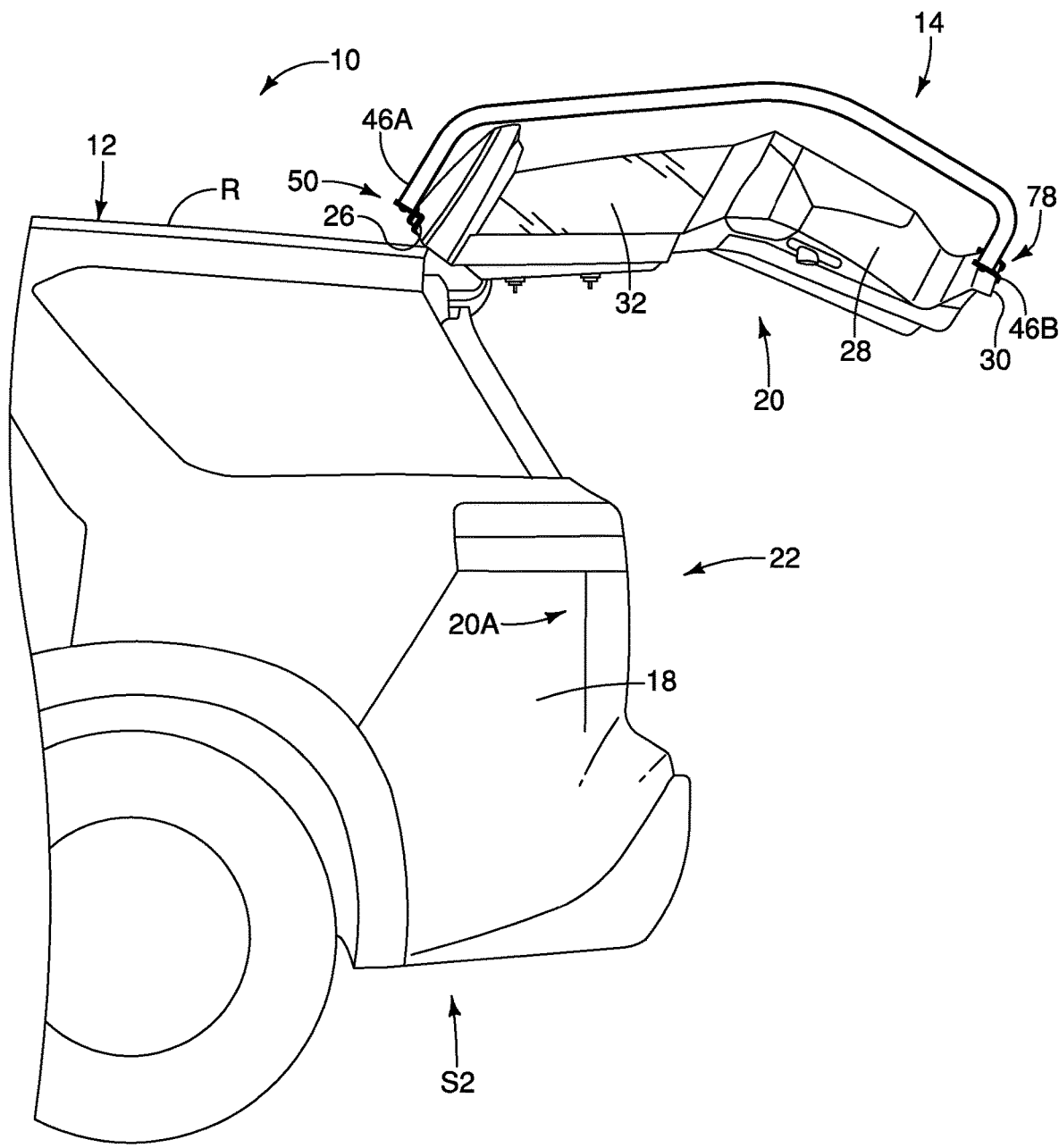
FIG. 2 is an elevational view of a vehicle side with the tailgate in an opened position.

The vehicle body 12 further includes a pair of side body panels 18 (a driver's side body panel shown in FIGS. 1 and 2). The side body panels 18 extend from the vehicle roof R to an underside S2 of the vehicle 10. As shown, the vehicle 10 further includes a rear hatch or a tailgate 20 that at least partially defines a rear end 25 of the vehicle 10. The tailgate 20 is movably attached to the vehicle body 12. That is, the tailgate 20 is movable between open and closed positions to enable a user's access to the vehicle's 10 interior storage area 22 from the vehicle rear end 25. The tailgate 20 also extends from the vehicle roof R to the underside S2 at a location that is offset of the side body panels 18. Preferably, the tailgate 20 is disposed directly adjacent to the side body panels 18 so to extend laterally between the side body panels 18. The tailgate 20 preferably aligned flush with the side body panels 18 when the tailgate 20 is in the closed condition.

Figure 3:
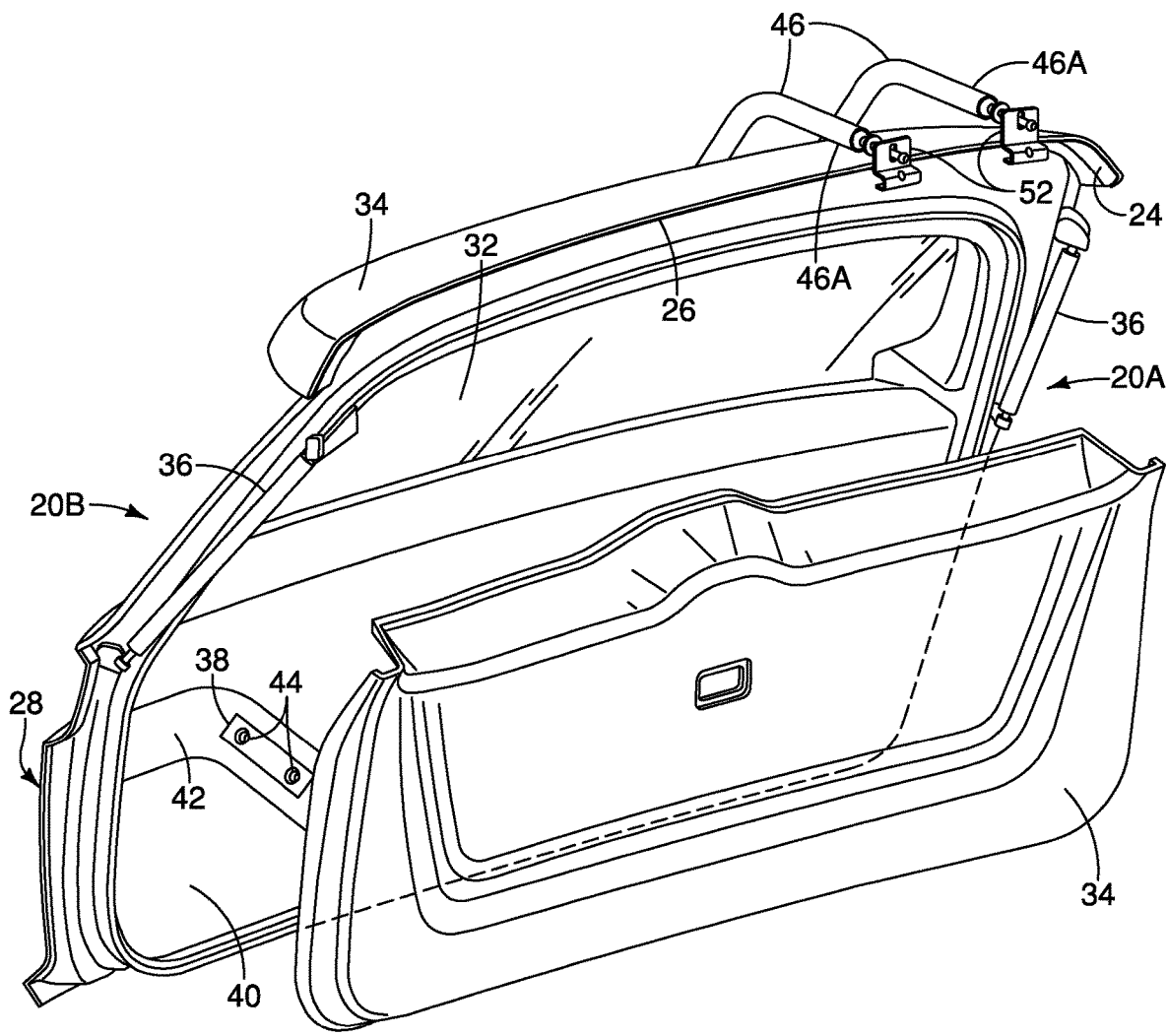
FIG. 3 is an exploded view of the vehicle's tailgate.
Figure 4:
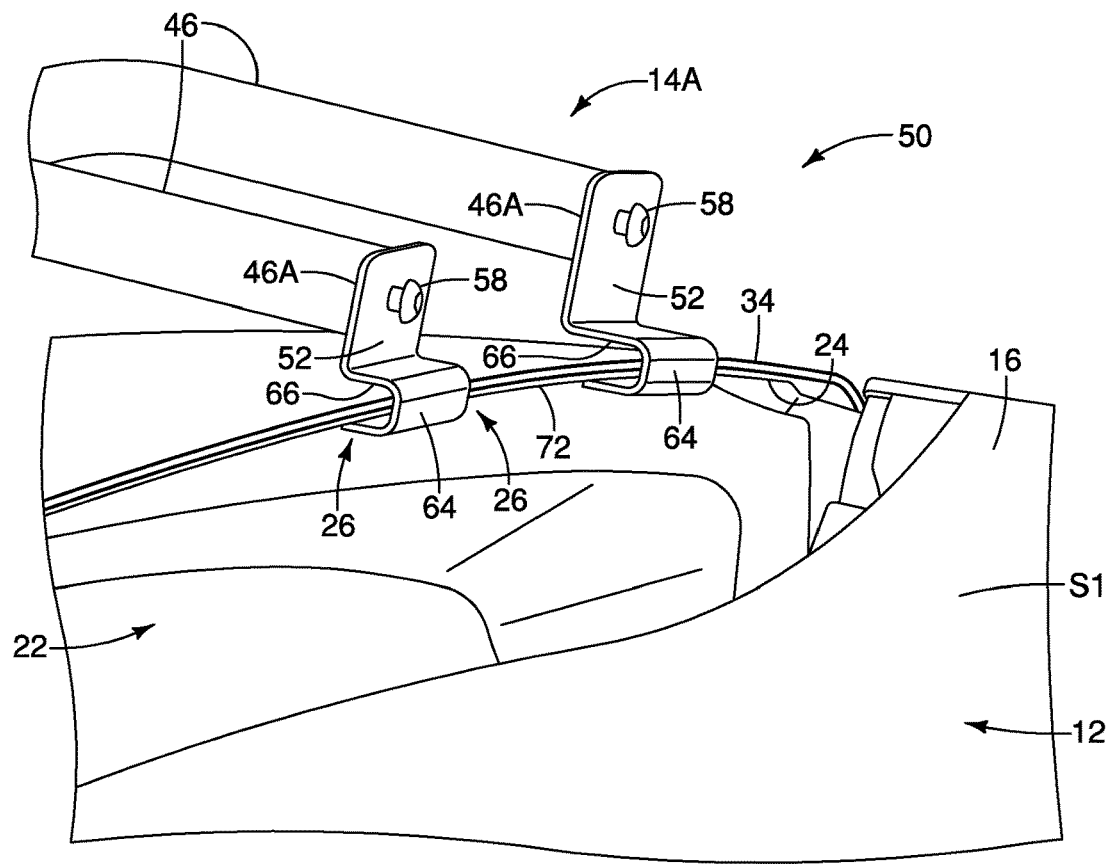
FIG. 4 is a perspective view of a first end of the ladder attached to a top of the tailgate.
Figure 5:
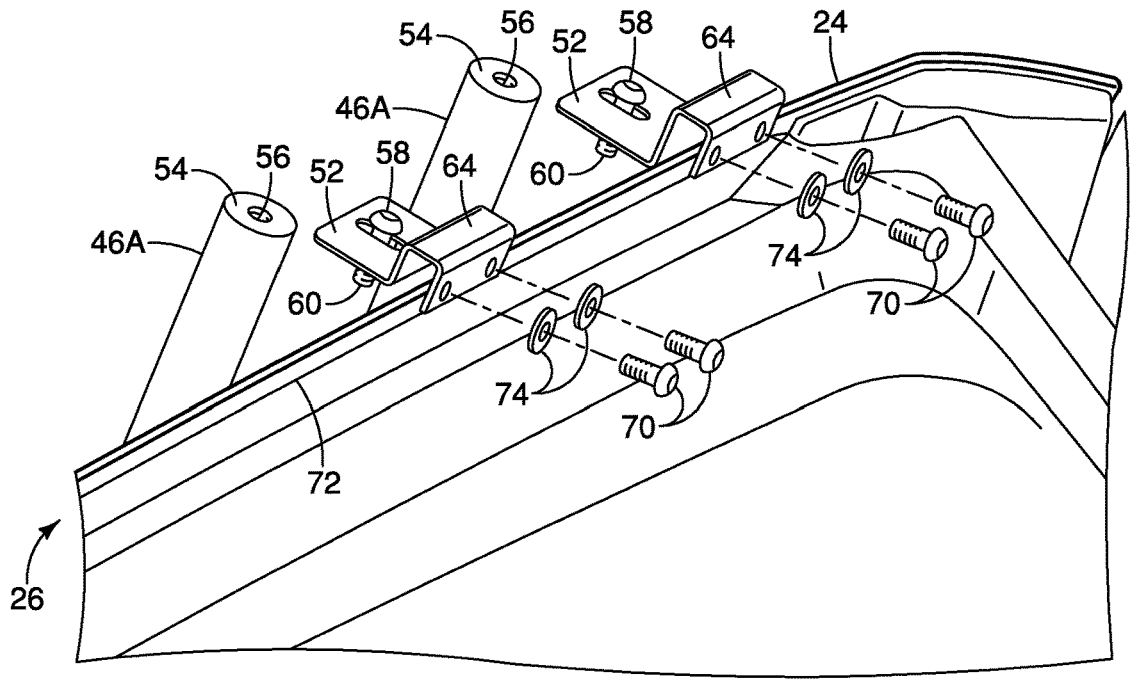
FIG. 5 is an exploded view of the first end of the ladder of FIG. 4 with respect to the top of the tailgate.

As best seen in FIGS. 3 to 5, the tailgate 20 includes a top panel 24 that at least partially defines the roof R of the vehicle body 12. That is, the top panel 24 has an external surface that faces upwards away from the vehicle interior 22. The top panel 24 includes a top edge 26 of the tailgate 20. The tailgate 20 further includes a main body panel 28 that at least partially defines the rear end 25 of the vehicle 10. The main body panel 28 includes a bottom edge 30 of the tailgate 20.

Preferably, the tailgate 20 includes a window panel 32 that is positioned between the top panel 24 and the main body panel 28. As shown in FIGS. 1 and 3, the tailgate 20 further includes a trim 34 that is attached to the top panel 24. As shown in FIG. 3, the trim 34 is disposed over an exterior facing surface of the top panel 24. The trim 34 is a plastic piece disposed over the top panel 24 so to cover the exterior facing surface of the top panel 24. The top trim 34 is a plastic trim 34 piece that provides a finishing aesthetic to the tailgate 20. As best seen in FIG. 1, the top panel 24 and the trim 34 together partially define the vehicle roof R and the roof surface S1 of the vehicle 10.

The main body panel 28 is a metal panel preferably made of stamped steel.

The window panel 32 is fixed to the top panel 24 and the main body panel 28. The top panel 24, the main body panel 28 and the window panel 32 together partially define the rear end 25 of the vehicle 10. The main body panel 28 and the window panel 32 aligns flush with the top panel 24 and the main body panel 28. The window panel 32 further preferably aligns flush with the side body panels 18 when the tailgate 20 is closed, as seen in FIG. 1. The tailgate 20 of the illustrated embodiment is preferably an automatic tailgate 20 that can open or close via electronic control or operation. Therefore, as seen in FIG. 3, the tailgate 20 includes one or more support struts 36 for automatic/electronic operation of the tailgate 20. In particular, the tailgate 20 includes a pair of support struts 36, each support strut 36 is located at a lateral side of the tailgate 20.

The support struts 36 are identical so only one of the support struts 36 will be described for brevity. The support strut 36 is a piston-like metal device that holds up the tailgate 20 with the aid of gas or hydraulic pressure. The support strut 36 is designed to keep the vehicle's tailgate 20 in the open state. The support strut 36 includes a piston that supports the weight of the tailgate 20 with the help of hydraulic pressure. The support strut 36 includes a spring and a shock absorber. The spring supports the weight of the vehicle and absorbs large bumps. The shock absorber operates to dampen vibrations.

In the illustrated embodiment, the ladder 14 is installed to the tailgate 20 so that the tailgate 20 protrudes rearward of the tailgate 20 as best seen in FIG. 2. The tailgate 20 includes a first lateral side 20A (e.g., a driver's side) and a second lateral side 20B (e.g., a passenger's side). As shown in FIG. 1, the ladder 14 is preferably installed to the tailgate 20 at a position closer to one lateral side of the tailgate 20 (e.g., the driver's side 20A as shown). That is, the ladder 14 is not installed to a center of the tailgate 20 so not to obstruct the driver's view through the window panel 32. However, it will be apparent those skilled in the vehicle field from this disclosure that the ladder 14 can alternatively be installed to the passenger's side of the tailgate 20 as needed and/or desired.

As stated, the tailgate 20 of the illustrated embodiment is preferably an automatic tailgate 20 that opens and/or closes in accordance with electronic control and/or operation. As the ladder 14 is installed to the tailgate 20 closer to one of the lateral sides (e.g., the driver's side 20A as shown), the weight of the ladder 14 on the tailgate 20 creates a weight imbalance for the tailgate 20. The weight imbalance causes the support struts 36 to operate to automatically close the tailgate 20 when a user is trying to open the tailgate 20.

Therefore, a counterweight 38 is provided to the vehicle 10 configured and positioned on the tailgate 20 to counterbalance the added weight of the ladder 14. In this way, the counterweight 38 is provided so that the support struts 36 do not automatically close the tailgate 20 when an operator attempts to open the tailgate 20. As shown in FIG. 3, the ladder 14 is provided to the first lateral side 20A (the driver's side). The counterweight 38 is provided to the tailgate 20 at the second lateral side 20B (the passenger's side) of the tailgate 20. The first and second lateral sides 20A and 20B are opposite with respect to each other. Therefore, the counterweight 38 is provided to the tailgate 20 at a lateral side (e.g., the first lateral side 20A) that is opposite with respect to the lateral side (e.g., the second lateral side 20B) having the tailgate 20.

As shown in FIG. 3, the counterweight 38 is provided on the main body panel 28 of the tailgate 20. In particular, the counterweight 38 is fixed to an interior facing surface 40 of the main body panel 28. That is, the counterweight 38 is supported to the stamped metal surface that is the interior facing surface 40. The counterweight 38 is positioned between the main body panel 28 and the trim 34. During installation of the counterweight 38, the trim 34 is removed to expose the interior facing surface 40 of the main body panel 28.

The counterweight 38 is a metal structure of any size or shape. Preferably, as shown in FIG. 3, the counterweight 38 is mounted to pre-existing contour(s) or depression(s) 42 of the interior facing surface 40. The counterweight 38 can be fixed to the main body panel 28 by screws, bolts or any other type of appropriate fasteners 44. Preferably, the counterweight 38 is approximate thirty to fifty percent of the total weight of the ladder 14. It will be apparent to those skilled in the vehicle field from this disclosure that the counterweight 38 does not need have the same weight as that of the ladder 14. Rather, it will be apparent to those skilled in the vehicle field from this disclosure that the counterweight 38 need only provide enough balance to the overall weight of the tailgate 20 having the ladder 14 installed thereon to prevent the support struts 36 from automatically closing the tailgate 20 when unwanted.

Figure 6:
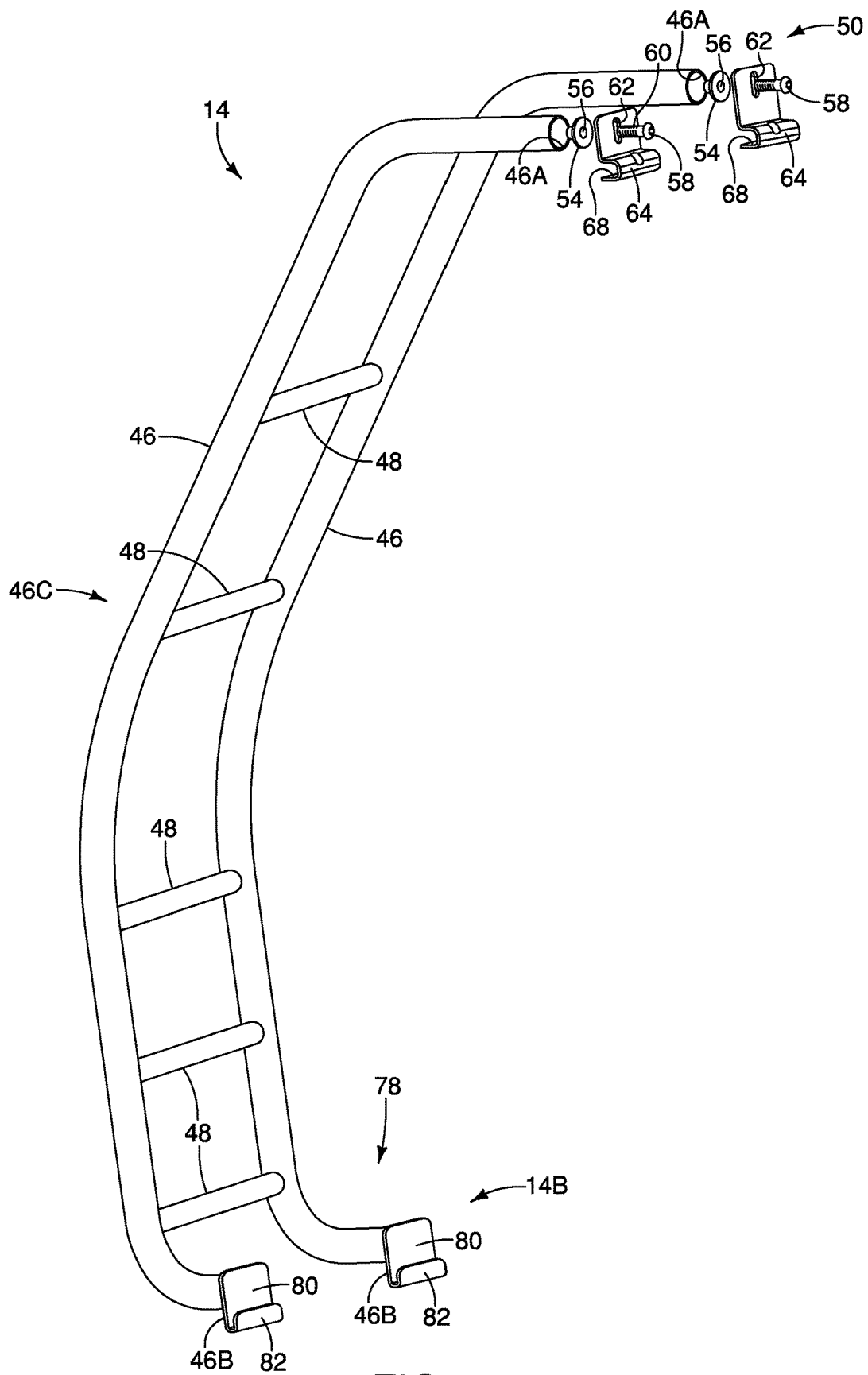
FIG. 6 is a perspective view of the ladder.

Referring to FIG. 6, the ladder 14 includes a pair of siderails 46 having a first end 46A that includes a top end 14A of the ladder 14 and a second end 46B that includes a bottom end 14B of the ladder 14. Therefore the ladder 14 has the first end 46A (e.g., the top end 14A of the siderails 46) and the second end 46B (e.g., the bottom end 14B of the siderails 46). The siderails 46 together define a longitudinal body 46C of the ladder 14. A longitudinal length of the longitudinal body 46C defines a longitudinal length of the ladder 14. The longitudinal body 46C of the ladder 14 crosses the tailgate 20 when the ladder 14 is installed to the tailgate 20.

Alternatively speaking, as shown in FIG. 1, the longitudinal body 46C extends from the top panel 24 and overlaps over the window panel 32 and the main body panel 28 when the ladder 14 is mounted to the vehicle body 12. The user can climb over the tailgate 20 via the ladder 14 in order to access the vehicle roof R. The ladder 14 further includes a plurality of rungs 48 connected to the pair of siderails 46. The rungs 48 are positioned in succession between the top and bottom end 14Bs of the ladder 14. The rungs 48 substantially define the lateral length of the ladder 14.

Figure 7:
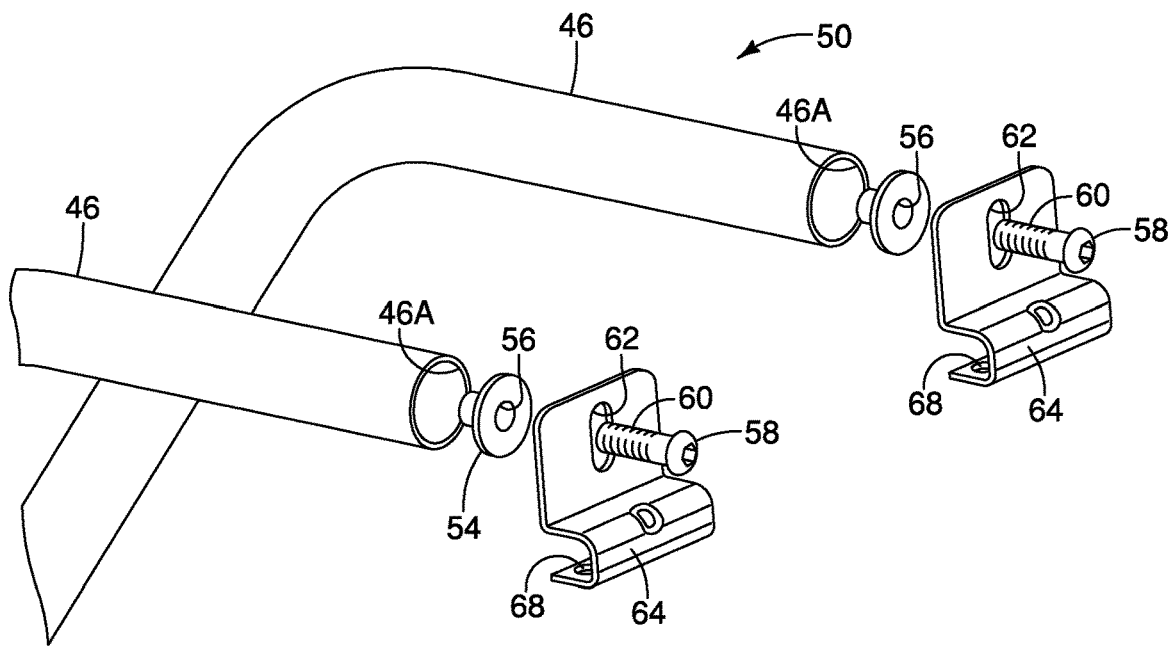
FIG. 7 is a perspective view of the first end of the ladder.

Referring to FIGS. 4, 5 and 7, the ladder 14 includes a top attachment part 50 that is attached to the top panel 24. In particular, the ladder 14 further includes a pair of top hanger plates 52. Each of the top hanger plates 52 is fixed to one of the first end 46A of the pair siderails 46. The top attachment part 50 includes the top hanger plates 52. Therefore, the top attachment part 50 is provided at the first end 46A of the ladder 14.

As best seen in FIGS. 5 to 7, the top end 14A of the siderails 46 are open ends. The ladder 14 further includes a pair of inserts 54 that are each received into the top ends 14A of the siderails 46. The inserts 54 are preferably integrally fixed to the top ends 14A, such as by welding and/or other appropriate attachment means. Each of the inserts 54 includes an internal threaded portion 56 for receiving a respective one of first fasteners 58, as shown in FIG. 5. Thus, the ladder 14 further includes a plurality of first fasteners 58 for mating with the inserts 54. In particular, the ladder 14 includes a pair of first fasteners 58 that attach the pair of top hanger plates 52 to the first ends 46A of the pair of siderails 46. Each of the first fasteners 58 includes an external thread 60 that mates with the internal threaded portion 56 of a respective one of the inserts 54. As best seen in FIG. 7, each of the top hanger plates 52 further includes an opening 62 that receives one of the first fasteners 58 therethrough. The top hanger plates 52 are attached to the siderails 46 via the inserts 54 and are secured to the inserts 54 by the first fasteners 58.

As shown in FIGS. 4 to 7, the top hanger plates 52 have a pair of first hooks 64 for attaching the ladder 14 to a tailgate 20 of the vehicle 10. That is, each of the top hanger plates 52 includes a respective first hook 64 that is attached to the tailgate 20. The top hanger plates 52 are made having the first hooks 64 integrally attached thereon. That is, the top hanger plates 52 can be molded having the first hooks 64. Alternatively, the first hooks 64 can be welded to the top hanger plates 52. Preferably, the top hanger plates 52 and the first hooks 64 are made of a rigid material such as metal, preferably steel or aluminum alloys.

The top attachment part 50 includes the first hooks 64 that are attached to the top edge 26 of the tailgate 20, as best shown in FIGS. 4, 5 and 7. The top edge 26 of the tailgate 20 is defined by both the top panel 24 and the trim 34, in the illustrated embodiment. In particular, the first hooks 64 are configured to have receiving slots 60. Each of the receiving slots 60 receives a portion of the top edge 26 of the tailgate 20.

As shown in FIGS. 5 and 7, each of the first hooks 64 includes at least one receiving opening 68 for receiving a second fastener 70 for securing the first hooks 64 to the top edge 26. In particular, each of the first hooks 64 includes a pair of receiving openings 68 for receiving a pair of second fasteners 70. Therefore, the ladder 14 is illustrated as including two pairs of second fasteners 70, each pair of second fasteners 70 for securing one of the second hooks 82 to the top panel 24. It will be apparent to those skilled in the vehicle from this disclosure that the ladder 14 can include additional or fewer receiving opening(s) for receiving additional or fewer second fastener(s) 70 as needed and/or necessary.

Referring to FIGS. 4 and 5, during installation, the top trim 34 is removed to expose the top panel 24, particularly an interior facing surface 72 of the top panel 24. The interior facing surface 72 faces away from the vehicle exterior and towards the vehicle's interior 22. Alternatively speaking, the interior facing surface 72 of the top panel 24 faces in a downward direction of the vehicle 10 when the tailgate 20 is closed.

Referring to FIG. 5, the interior facing surface 72 of the top panel 24 includes at least one top fastening receiving structure 74 located on the interior facing surface 72 of the top panel 24. In the illustrated embodiment, the top fastening receiving structure 74 is a weld nut 74 that is pre-welded to the interior facing surface 72 of the top panel 24. In the illustrated embodiment, the vehicle includes two pairs of weld nuts 74, each of the weld nuts 74 are attached to one of the second fasteners 70. The weld nuts 74 include threads that mate with threaded portions of the second fasteners 70. Therefore, the top panel 24 of the tailgate 20 includes at least one top fastening receiving structure 74 that is pre-fixed to the interior facing surface 72 of the top panel 24. The second fasteners 70 are received by a respective one of the top fastening receiving structures 74.

However, it will be apparent to those skilled in the vehicle from this disclosure that the vehicle 10 can include additional or fewer weld nuts 74 for making with additional or fewer second fastener(s) 70 as needed and/or necessary. The weld nuts 74 are pre-welded to the top panel 24. Preferably, the weld nuts 74 are rivet-type weld nuts 74 that are made of metal and receives the second fasteners 70. During installation, after the top trim 34 is removed, the user drills openings in the top panel 24 at locations that correspond to the location of the weld nuts 74. The second fasteners 70 extend through the weld nuts 74, the drilled openings and the receiving openings 68 of the first hooks 64 to secure the first hooks 64 to the top panel 24. Therefore, the ladder 14 includes at least one second fastener 70 extending through the top attachment part 50 and the top panel 24 of the tailgate 20 to attach the top attachment part 50 to the top panel 24.

Figure 8:
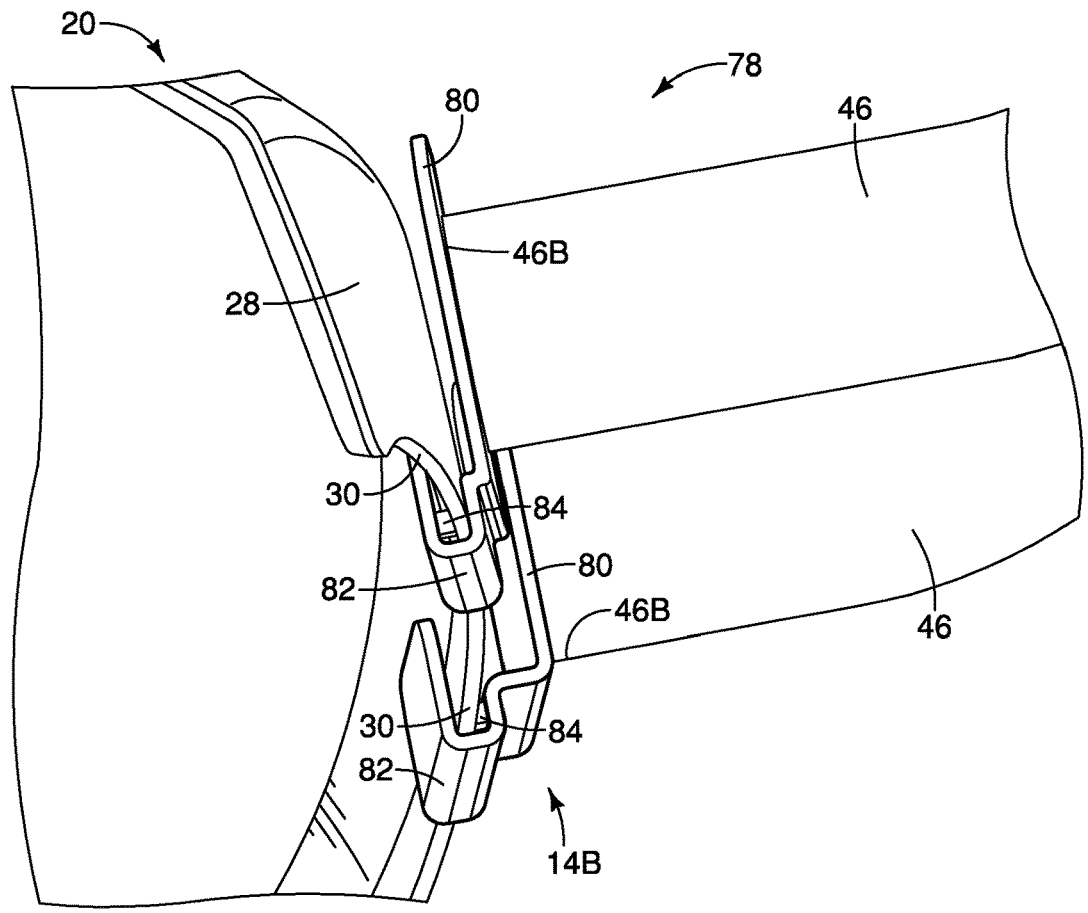
FIG. 8 is a perspective view of a second end of the ladder attached to a bottom of the tailgate.

Referring to FIGS. 6 and 8, the ladder 14 includes a bottom attachment part 78 that is attached to the main body panel 28. The bottom attachment part 78 is provided at the second end 46B (e.g., the bottom end 14B of the ladder 14) of the siderails 46. The bottom attachment part 78 includes a pair of bottom hanger plates 80. Therefore, the ladder 14 further includes the bottom hanger plates 80 that are fixed to the second end 46B of the siderails 46. The bottom hanger plates 80 has a pair of second hooks 82 for attaching the ladder 14 to the tailgate 20 of the vehicle 10. The bottom hanger plates 80 are made having the second hooks 82 integrally attached thereon. That is, the bottom hanger plates 80 can be molded having the second hooks 82. Alternatively, the second hooks 82 can be welded to the bottom hanger plates 80. Preferably, the bottom hanger plates 80 and the second hooks 82 are made of a rigid material such as metal, preferably steel or aluminum alloys.

As best seen in FIG. 8, the second hooks 82 of the bottom attachment part 78 receive the bottom edge 30 of the tailgate 20. Therefore, the bottom attachment part 78 is attached to the bottom edge 30 of the tailgate 20. As best seen in FIG. 8, the bottom attachment part 78 includes a pair of felt pads 84 or other type of elastic member located in the receiving slots 60 of the second hooks 82. The felt pads 84 are preferably secured to the second hooks 82 by adhesive. In the illustrated embodiment, the bottom attachment part 78 is frictionally attached to the main body panel 28. That is, the second hooks 82 frictionally receive the bottom edge 30 of the tailgate 20 to attach the bottom attachment part 78 of the ladder 14 to the tailgate 20.

General Interpretation of Terms

In understanding the scope of the present invention, the term "comprising" and its derivatives, as used herein, are intended to be open ended terms that specify the presence of the stated features, elements, components and/or groups but do not exclude the presence of other unstated features, elements, components and/or groups. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle ladder. Accordingly, these terms, as utilized to describe the present invention should be interpreted relative to a vehicle equipped with the vehicle ladder.

The term "configured" as used herein to describe a component, section or part of a device that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle comprising:
a vehicle body defining an interior storage area of the vehicle;
a tailgate movably attached to the vehicle body between an open position and a closed position, the tailgate including a hinge at an upper end portion of the tailgate movably attaching the tailgate to the vehicle body, the tailgate enclosing the interior storage area in the closed position and exposing the interior storage area in the open position;
a ladder attached to the tailgate at a first lateral side of the tailgate, the ladder moving with the tailgate about the hinge as the tailgate moves between the open and closed positions; and
a counterweight provided to the tailgate at a second lateral side of the tailgate that is opposite of the first lateral side to provide a counterbalance to a weight of the ladder such that when the tailgate moves from the closed position and the open position, the ladder and the counterweight moving upwardly with the tailgate as the tailgate pivots about the hinge.

2. The vehicle according to claim 1, wherein
the tailgate includes a top panel that at least partially defines a roof of the vehicle body, and includes a main body panel that at least partially defines a rear end of the vehicle.

3. The vehicle according to claim 2, wherein
the counterweight is provided on the main body panel.

4. The vehicle according to claim 3, wherein
the counterweight is fixed to an interior facing surface of the main body panel, the interior facing surface facing the interior storage area of the vehicle.

5. The vehicle according to claim 4, wherein
the tailgate includes a trim that is attached to the main body panel, the counterweight is positioned between the main body panel and the trim.

6. The vehicle according to claim 5, wherein
the interior facing surface of the body panel has a depression, the counterweight contacts an interior facing surface of the depression of the main body panel that faces the interior storage area of the vehicle.

7. The vehicle according to claim 6, wherein
the counterweight includes a metal material.

8. The vehicle according to claim 7, wherein
the counterweight and the interior facing surface of the depression of the body panel receives a fastener therethrough to that fastens the counterweight to the main body panel.

9. The vehicle according to claim 6, wherein
the counterweight is approximate thirty to fifty percent of the total weight of the ladder.

10. The vehicle according to claim 2, wherein
the ladder includes a top attachment part that is attached to the top panel, and includes a bottom attachment part that is attached to the main body panel.

11. The vehicle according to claim 1, wherein
the tailgate includes a top panel that includes a top edge of the tailgate, and includes a main body panel that includes a bottom edge of the tailgate.

12. The vehicle according to claim 11, wherein
the counterweight is fixed to an interior facing surface of the main body panel.

13. The vehicle according to claim 12, wherein
the ladder includes a top attachment part that is attached to the top panel, and includes a bottom attachment part that is attached to the main body panel.

14. The vehicle according to claim 13, wherein
the top attachment part is attached to the top edge of the tailgate, and the bottom attachment part is attached to the bottom edge of the tailgate.

15. The vehicle according to claim 10, wherein
the ladder includes at least one fastener extending through the top attachment part and the top panel of the tailgate to attach the top attachment part to the top panel.

16. The vehicle according to claim 15, wherein
the top panel includes a top fastening receiving structure that is pre-fixed to an interior facing surface of the top panel, the at least one fastener being received by the top fastening receiving structure.

17. The vehicle according to claim 16, wherein
the bottom attachment part is frictionally attached to the main body panel.

18. The vehicle according to claim 14, wherein
the ladder includes at least one fastener extending through the top attachment part and the top panel of the tailgate to attach the top attachment part to the top panel.

19. The vehicle according to claim 18, wherein
the bottom attachment part is frictionally attached to the main body panel.

* * * * *